United States Patent
Cash

(10) Patent No.: US 9,067,618 B2
(45) Date of Patent: Jun. 30, 2015

(54) TOUCH-BASED SYSTEM FOR CONTROLLING AN AUTOMOTIVE STEERING WHEEL

(71) Applicant: Duane Matthew Cash, Mountain View, CA (US)

(72) Inventor: Duane Matthew Cash, Mountain View, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 119 days.

(21) Appl. No.: 13/914,983

(22) Filed: Jun. 11, 2013

(65) Prior Publication Data

US 2014/0365076 A1    Dec. 11, 2014

(51) Int. Cl.
| | |
|---|---|
| *B62D 5/00* | (2006.01) |
| *B62D 6/00* | (2006.01) |
| *B62D 1/00* | (2006.01) |
| *B62D 1/02* | (2006.01) |
| *B62D 1/04* | (2006.01) |
| *B62D 1/06* | (2006.01) |

(52) U.S. Cl.
CPC *B62D 1/02* (2013.01); *B62D 1/046* (2013.01); *B62D 1/06* (2013.01); *B62D 5/001* (2013.01)

(58) Field of Classification Search
USPC .............. 701/36, 41; 180/78, 400; 200/51 R, 200/61.54
See application file for complete search history.

(56) References Cited

U.S. PATENT DOCUMENTS

| | | | |
|---|---|---|---|
| 6,997,281 B2 | 2/2006 | Chernoff et al. | |
| 7,321,311 B2 | 1/2008 | Rieth et al. | |
| 2006/0054479 A1* | 3/2006 | Iisaka et al. ................ | 200/61.57 |
| 2011/0241850 A1* | 10/2011 | Bosch et al. ................ | 340/384.6 |
| 2012/0019449 A1 | 1/2012 | Yilmaz et al. | |
| 2012/0074814 A1* | 3/2012 | Chang ............................ | 310/339 |
| 2013/0032002 A1* | 2/2013 | Kuntzel .......................... | 74/558 |

* cited by examiner

*Primary Examiner* — Yonel Beaulieu
(74) *Attorney, Agent, or Firm* — Pearne & Gordon LLP

(57) ABSTRACT

Provided is a system for generating a vehicle steering signal. A non-rotatable steering control is mounted about a steering axis. The steering control includes a pressure sensor configured to generate an output signal in response to hand movements along the steering control. The system includes a hub and at least one spoke connecting the steering control to the hub. The hub is offset from the steering axis. A control unit is configured to generate the vehicle steering signal based on the output signal from the pressure sensor.

20 Claims, 3 Drawing Sheets

TOUCH-BASED SYSTEM FOR CONTROLLING AN AUTOMOTIVE STEERING WHEEL

BACKGROUND

1. Technical Field

The present disclosure relates to steering controls for vehicles, such as a steering wheel in an automobile.

2. Description of Related Art

Conventional automobile steering wheels are mechanically linked via a steering column to a power-assisted rack and pinion system. It is known to replace or augment various mechanical devices in automobiles, such as the steering system, with so-called drive-by-wire systems. Drive-by-wire systems can be lighter and less expensive than corresponding mechanical systems, and can provide design engineers more flexibility in the configuration and placement of components.

BRIEF SUMMARY

The following summary presents a simplified summary in order to provide a basic understanding of some aspects of the devices and systems discussed herein. This summary is not an extensive overview of the devices and systems discussed herein. It is not intended to identify critical elements or to delineate the scope of such devices and systems. Its sole purpose is to present some concepts in a simplified form as a prelude to the more detailed description that is presented later.

In accordance with one aspect, provided is a system for generating a vehicle steering signal. A non-rotatable steering control is mounted about a steering axis. The steering control includes a pressure sensor configured to generate an output signal in response to hand movements along the steering control. The system includes a hub and at least one spoke connecting the steering control to the hub. The hub is offset from the steering axis. A control unit is configured to generate the vehicle steering signal based on the output signal from the pressure sensor.

In certain embodiments, a steering control column attaches the hub to a vehicle to be steered, and the steering control column extends along a column axis, the steering axis and the column axis being non-coincident.

In certain embodiments, a communication module is located in the hub and is configured to send steering requests to the control unit based on changes in the output signal from the pressure sensor.

In certain embodiments, the pressure sensor comprises a first piezoelectric pressure transducer extending along a first circumferential portion of the steering control, and a second piezoelectric pressure transducer extending along a second circumferential portion of the steering control. In further embodiments, the first circumferential portion is greater than 90 degrees and the second circumferential portion is greater than 90 degrees. In additional embodiments, respective signal levels generated by the first and second piezoelectric pressure transducers change with hand movements along the steering control.

In certain embodiments, the steering control is aligned with an instrument cluster of the vehicle to be steered, and an open area within the steering control and above the hub, for viewing the instrument cluster through the steering control, is greater than a total remaining area enclosed by the steering control, wherein the total remaining area includes the hub the at least one spoke. In further embodiments, the at least one spoke comprises a first lateral spoke connecting the steering control to the hub at a first lateral side of the hub, a second lateral spoke connecting the steering control to the hub at a second lateral side of the hub, and a central spoke connecting the steering control to the hub at a location along the steering control between connections to the first and second lateral spokes. The first and second lateral spokes are longer than the central spoke, and the total remaining area includes the first lateral spoke, the second lateral spoke, the central spoke, and further open areas.

In accordance with another aspect, provided is a system for generating a vehicle steering signal. A non-rotatable steering control is mounted about a steering axis. The steering control includes a sensor configured to generate an output signal in response to hand movements along the steering control. The system includes a hub connected to the steering control. The hub is offset from the steering axis. A control unit is configured to generate the vehicle steering signal based on the output signal from the sensor. The steering control is aligned with an instrument cluster of the vehicle to be steered. An open area within the steering control and above the hub, for viewing the instrument cluster through the steering control, is greater than a total remaining area enclosed by the steering control, wherein the total remaining area includes the hub.

In certain embodiments, a steering control column attaches the hub to a vehicle to be steered, wherein the steering control column extends along a column axis, the steering axis and the column axis being non-coincident.

In certain embodiments, a communication module is located in the hub, and is configured to send steering requests to the control unit based on changes in the output signal from the sensor.

In certain embodiments, the sensor comprises a pressure sensor including a first piezoelectric pressure transducer extending along a first circumferential portion of the steering control, and a second piezoelectric pressure transducer extending along a second circumferential portion of the steering control. In further embodiments, the first circumferential portion is greater than 120 degrees and the second circumferential portion is greater than 120 degrees. In additional embodiments, respective signal levels generated by the first and second piezoelectric pressure transducers change with hand movements along the steering control. In still additional embodiments, the steering control comprises a first lateral spoke connecting the steering control to the hub at a first lateral side of the hub, a second lateral spoke connecting the steering control to the hub at a second lateral side of the hub, and a central spoke connecting the steering control to the hub at a location along the steering control between connections to the first and second lateral spokes. The first and second lateral spokes are longer than the central spoke, and the total remaining area includes the first lateral spoke, the second lateral spoke, the central spoke, and further open areas.

In accordance with another aspect, provided is a system for generating a vehicle steering signal. A non-rotatable steering wheel is mounted about a steering axis. The steering wheel includes a hub that is offset from the steering axis, and a pressure sensor configured to generate an output signal in response to hand movements along the steering wheel. A steering control column attaches the hub to a vehicle to be steered. The steering control column extends along a column axis. The steering axis and the column axis are non-coincident. A control unit is configured to generate the vehicle steering signal based on the output signal from the pressure sensor. The steering wheel is aligned with an instrument cluster of the vehicle to be steered. The steering wheel forms an open area above the hub, the open area being enclosed by the steering wheel and at least partially by the hub, for viewing the instrument cluster through the steering wheel. The open area is greater than a total remaining area enclosed by the steering wheel, the total remaining area including the hub.

In certain embodiments, the steering wheel further comprises a first lateral spoke connecting the steering wheel to the hub at a first lateral side of the hub, a second lateral spoke connecting the steering wheel to the hub at a second lateral side of the hub, and a central spoke connecting the steering wheel to the hub at a location along the steering wheel between connections to the first and second lateral spokes. The first and second lateral spokes are longer than the central spoke, the open area is enclosed by the steering wheel, the hub and the first and second lateral spokes, and the total remaining area includes the first lateral spoke, the second lateral spoke, the central spoke, and further open areas.

In certain embodiments, a communication module is located in the hub, and configured to send steering requests to the control unit based on changes in the output signal from the pressure sensor.

In certain embodiments, the pressure sensor comprises a first piezoelectric pressure transducer extending along a left hand portion of the steering wheel, and a second piezoelectric pressure transducer extending along a right hand portion of the steering wheel. In further embodiments, respective signal levels generated by the first and second piezoelectric pressure transducers change with hand movements along the steering wheel.

DETAILED DESCRIPTION

Figure 1:
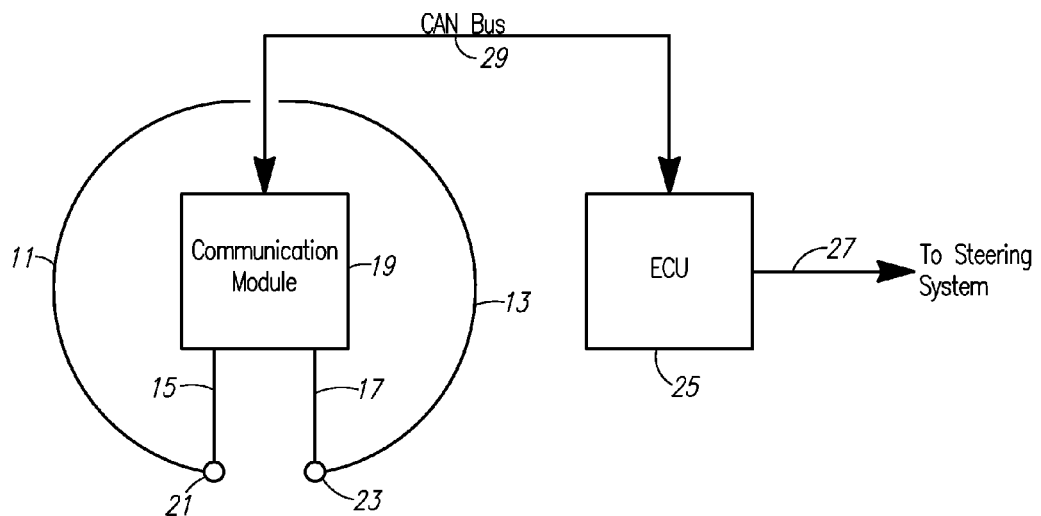
FIG. 1 is a schematic diagram of an example system for generating a vehicle steering signal.

The present disclosure relates to steering controls for vehicles, such as a steering wheel in an automobile. The present apparatus or method will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present disclosure. It may be evident, however, that the present apparatus or method can be practiced without these specific details. Additionally, other embodiments of the apparatus or method are possible and the apparatus or method is capable of being practiced and carried out in ways other than as described. The terminology and phraseology used in describing the apparatus or method is employed for the purpose of promoting an understanding of the disclosure and should not be taken as limiting.

FIGS. 1-5 show aspects of a drive-by-wire steering system. As will be discussed in detail below, the drive-by-wire steering system includes a non-rotatable steering control or steering wheel. The non-rotatable steering wheel has sensors (pressure sensors, capacitive sensors, etc.) for detecting the position and/or movements of a driver's hands. Since the steering wheel does not rotate, the driver steers by sliding his hands along the wheel. In certain embodiments, the sensors sense the pressure of the driver's hands on the steering wheel, and generate respective signals that vary with the position of the driver's hands. Circuitry in the steering wheel interprets the signals as steering motions or steering commands by the driver, and generates corresponding steering requests. The steering requests are sent to an electronic control unit (ECU) associated with the steering system. The ECU generates one or more vehicle steering signals based on the steering requests, to control the operation of actuators in the steering system. Because the sensors sense pressure rather than capacitance, the steering wheel can be operated while the driver is wearing gloves.

In a conventional automobile, the steering wheel is attached to a proximal, upper portion of the steering column at a central hub of the steering wheel. The central hub often has operator controls, such as temperature controls, audio controls, a horn switch, etc., and an airbag. The steering axis of the steering wheel, that is, the axis around which the steering wheel turns, passes through the central hub and the upper portion of the steering column. The steering axis is coincident with the axis of the upper portion of the steering column. In such a configuration, the driver's view of any instruments in an instrument cluster located behind the steering wheel is limited by the central hub and any spokes connecting the central hub to the steering wheel.

The steering wheel discussed herein and shown in the figures is non-rotatable, which allows the hub to be moved away from the steering axis. For example, the hub can be moved downward, toward the 6:00 position of the steering wheel. Moving the hub downward can provide a large opening above the hub within the steering wheel. The large opening can make the steering wheel less obstructive to viewing the instrument cluster through the steering wheel, and can allow more instruments to be viewed simultaneously.

FIG. 1 schematically shows a system for generating a vehicle steering signal. The non-rotatable steering control or steering wheel is not shown in FIG. 1. However, pressure sensors 11, 13 installed in the steering control are shown. Example pressure sensors 11, 13 are piezoelectric pressure transducers in the form of strips. The strips can be mounted on the surface of the steering control, or under an outer cover or wrapping for the steering control. Two pressure sensors 11, 13 are shown in FIG. 1. However, it is to be appreciated that the steering control can have only one pressure sensor, or more than two pressure sensors. In a configuration having two pressure sensors 11, 13, a first one 11 of the pressure sensors can be located on the steering wheel to sense the position and/or movement of a driver's left hand, and a second one 13 of the pressure sensors can be located on the steering wheel to sense the position and/or movement of the driver's right hand. For example, the first pressure sensor 11 can be located on the left side or left hand portion of the steering wheel, extending counterclockwise along a first circumferential portion of the steering wheel, substantially from the 12:00 position to the 6:00 position. The second pressure sensor 13 can be located on the right side or right hand portion of the steering wheel, extending clockwise along a second circumferential portion of the steering wheel, substantially from the 12:00 position to the 6:00 position. Thus, the two pressure sensors 11, 13 together extend along substantially the entire circumference of the steering wheel. The circumferential portion of the steering wheel along which a pressure sensor extends can be any length as desired, and can be based on the number of pressure sensors installed on the steering wheel. For example, a pressure sensor can extend along a circumferential portion of the steering wheel for less than 45°, 45°-90°, more than 90°, 90°-120°, more than 120°, 120°-180°, more than 180°, less than 360°, etc.

The pressure sensors 11, 13 generate respective output signals 15, 17 in response to the driver's hand position and/or hand movements along the steering wheel. For example, the pressure applied by the driver's hand at a particular location along a pressure sensor can cause the pressure sensor to generate a localized voltage due to the piezoelectric effect. Because the pressure sensor is relatively long and presents impedance that varies along its length, the signal generated by the pressure sensor at the output of the pressure sensor will be different for different hand positions. For example, the amplitude of the signal will vary among touches at different positions along the steering wheel. In one example embodiment, the voltage level at the output of a pressure sensor is dependent upon the position of a driver's hand on the steering wheel.

The output signals 15, 17 are provided to a communication module 19 located in the hub of the steering wheel. In the schematic example of FIG. 1, the pressure sensors 11, 13 are connected to contacts or terminations 21, 23, and the output signals 15, 17 are taken from the contacts or terminations 21, 23 and received by the communication module 19. The communication module 19 processes the output signals 15, 17 from the pressure sensors to determine a driver's steering commands. The communication module 19 generates and sends steering requests based on the signal levels from the pressure sensors 11, 13, the rate of change of the signals, the length of time that a signal changes, the direction of signal changes (increasing or decreasing in magnitude), etc. For example, if the communication module 19 observes the signal from the left hand pressure sensor 11 increase while the signal from the right hand pressure sensor 13 decreases, it can determine that a left turn is being commanded. The communication module 19 generates a corresponding steering request and sends the steering request to an ECU 25 for the steering system. The communication module 19 can also distinguish between steering commands and other hand movements not intended to change the steering angle. For example, if the driver repositions his hands along the steering control, causing the signals from both pressure sensors 11, 13 to increase or decrease, the communication module 19 can determine that no change in steering angle should be made.

Upon receiving the steering request, the ECU 25 will generate a vehicle steering signal 27 to control the operation of steering actuators (not shown) in the steering system. The steering requests from the communication module 19 can be sent to the ECU via a network bus, such as a CAN bus 29.

Figure 2:
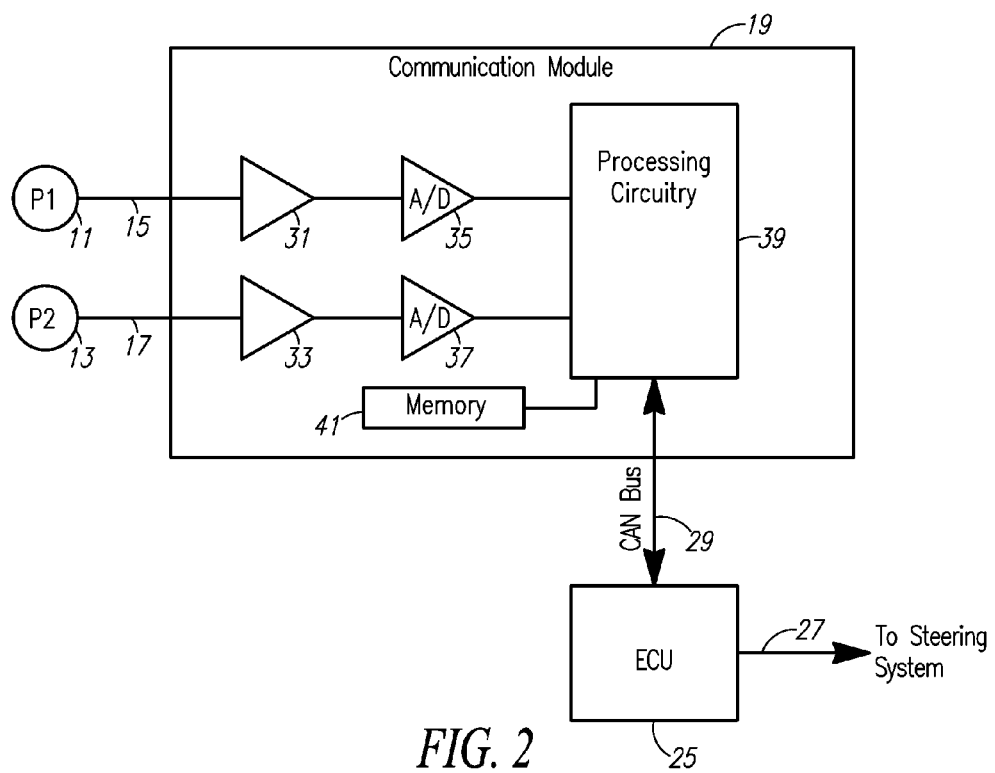
FIG. 2 is a schematic diagram of an example system for generating a vehicle steering signal.

An example communication module 19 is shown in further detail in FIG. 2. The communication module 19 can include amplifiers 31, 33 for amplifying the signals from the pressure sensors 11, 13, and additional signal conditioning circuitry (e.g., filters, integrators, etc.). The communication module 19 can include analog-to-digital converters 35, 37 and processing circuitry 39 for generating the steering requests. The processing circuitry 39 can include one or more of a microprocessor, a microcontroller, a digital signal processor (DSP), an application specific integrated circuit (ASIC), a field-programmable gate array (FPGA), discrete logic circuitry, or the like. The communication module 19 can further include memory 41 that stores program instructions that cause the processing circuitry 39 to provide the functionality ascribed to it herein.

Figure 3:
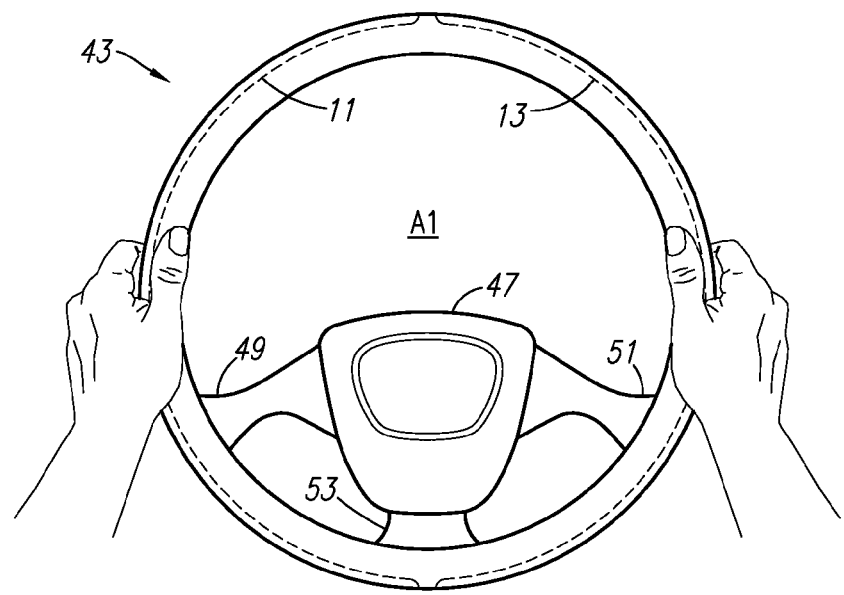
FIG. 3 shows an example steering control.

FIG. 3 shows an example non-rotatable steering control 43. In FIG. 3, the steering control 43 is shown as a circular steering wheel. However, the steering control 43 or steering wheel need not be circular, but could have any of a variety of non-circular shapes suitable for use as a steering wheel to allow a driver to enter steering commands. In FIG. 3, the pressure sensors 11, 13 are located beneath an outer cover of the steering control 43 and are identified by dashed lines. As described above, the pressure sensors 11, 13 pick up the driver's steering commands, which are made through movements of the driver's hands along the steering control 43. The steering control 43 includes a hub 47 and, in certain example embodiments, at least one spoke connecting the hub to the steering control. In FIG. 3, the steering control 43 has three spokes 49, 51, 53 connecting the hub 47 to the steering control. Unlike conventional steering wheels, the hub 47 is offset from the steering axis of the steering control 43. The steering axis is at the center of the steering control 43, but the hub 47 is offset downward from the center of the steering control toward the 6:00 position of the steering control. Because the hub 47 is offset downward from the steering axis, the central spoke 53 at the bottom of the hub is shorter than (not as long as) the lateral spokes 49, 51. The lateral spokes 49, 51 connect the lateral sides of the hub 47 to the steering control 43, and the central spoke 53 connects the steering control to the hub at the 6:00 position, between the connections of the steering control to the lateral spokes.

The steering control 43 completely encloses or substantially encloses an area inside of the steering control, and this enclosed area includes the hub 47, spokes, 49, 51, 53 and open areas. In the example embodiment shown in FIG. 3, the steering control 43 encloses a circular area within the inner circumference of the steering control. An open area A1 within the steering control 43 and above the hub 47 and lateral spokes 49, 51 is identified in FIG. 3. Because the hub 47 is offset downward, the open area A1 constitutes the majority of the circular area within the inner circumference of the steering control 43. That is, the size of open area A1 is greater than 50% of the circular area within the inner circumference of the steering control 43, and is greater than the total remaining area within the inner circumference of the steering control (the total remaining area including the area occupied by the hub 47, the spokes 49, 51, 53 and the two open areas between the spokes). The downward offset of the hub 47 provides a large open area A1 within the steering control 43 and above the hub.

Figure 4:
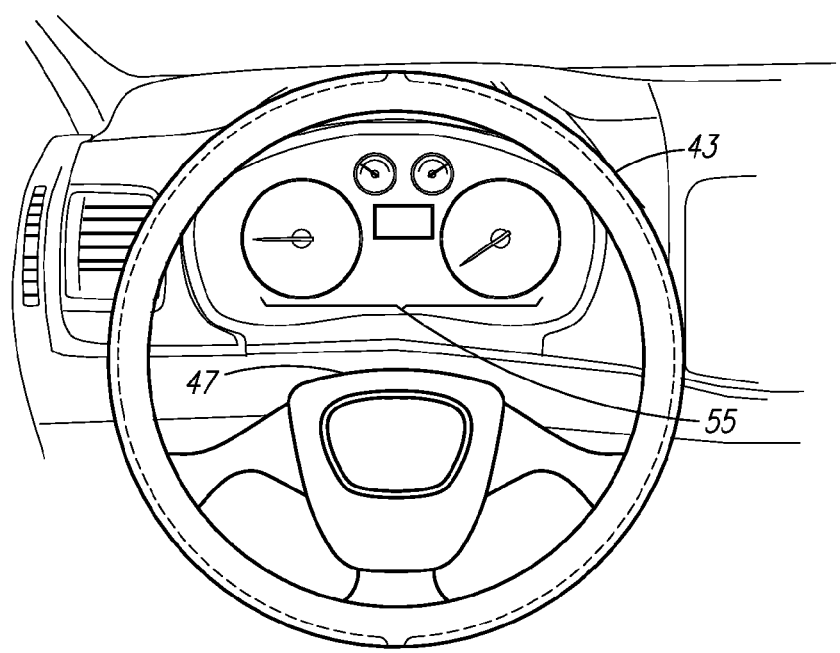
FIG. 4 shows an example steering control.

FIG. 4 shows the steering control 43 aligned with an instrument cluster 55 of a vehicle to be steered. The large open area in the steering control 43, above the hub 47 and lateral spokes 49, 51, can provide a larger field of view through the steering control as compared to conventional steering wheels. The large open area can allow more instruments to be viewed simultaneously and reduce the likelihood that the steering control 43 will obstruct the view of an instrument in the instrument cluster 55.

Various operator controls and other devices can be provided on the hub 47 and/or spokes 49, 51, 53 of the steering control 43 (FIG. 3). Examples of such controls and other devices include temperature controls, audio controls, cruise control, a horn switch, voice-recognition controls, a Bluetooth interface, an airbag, etc.

Figure 5:
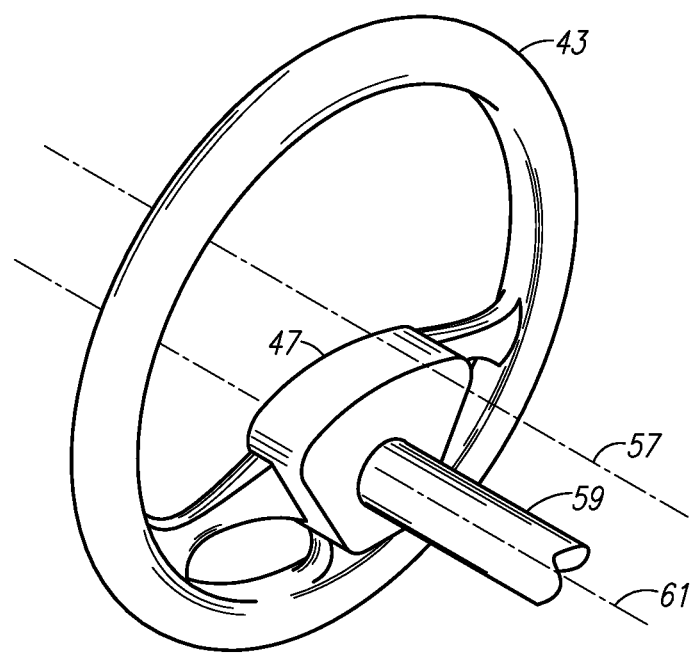
FIG. 5 is a perspective view of an example steering control.

FIG. 5 provides a perspective view of the steering control 43. The steering axis 57 is shown passing through the center of the steering control 43. It can be seen that the hub 47 is offset from the steering axis 57. For example, the center of the hub 47 is offset from the steering axis 57 downward, toward the 6:00 position of the steering control 43. In certain embodiments, the steering axis 57 does not pass through any portion of the hub 47, and the hub 47 is entirely offset from the steering axis 57. In other embodiments, though the hub 47 is offset from the steering axis 57, the steering axis passes through some portion of the hub 47, such as an upper or top portion of the hub.

A segment of a steering control column 59 is shown in FIG. 5. In certain embodiments, the steering control column 59 attaches the steering control 43 to the vehicle. The steering control column 59 is attached to the hub 47 at a proximal end and to the vehicle at a distal end. In certain embodiments, the steering control column 59 is a tilt steering column to provide tilt steering adjustability to the steering control 43. The steering control column 59 extends along a column axis 61. It can be seen that the steering axis 57 and the column axis 61 are non-coincident. This is due to the hub 47, through which the column axis 61 passes, being offset from the steering axis 57.

It should be evident that this disclosure is by way of example and that various changes may be made by adding, modifying or eliminating details without departing from the fair scope of the teaching contained in this disclosure. The apparatus or method is therefore not limited to particular details of this disclosure except to the extent that the following claims are necessarily so limited.

What is claimed is:

1. A system for generating a vehicle steering signal, comprising:
   a non-rotatable steering control mounted about a steering axis, the steering control comprising a pressure sensor configured to generate an output signal in response to hand movements along the steering control;
   a hub;
   at least one spoke connecting the steering control to the hub, wherein the hub is offset from the steering axis; and
   a control unit configured to generate the vehicle steering signal based on the output signal from the pressure sensor.

2. The system of claim 1, comprising a steering control column attaching the hub to a vehicle to be steered, wherein the steering control column extends along a column axis, the steering axis and the column axis being non-coincident.

3. The system of claim 1, comprising a communication module located in the hub, and configured to send steering requests to the control unit based on changes in the output signal from the pressure sensor.

4. The system of claim 1, wherein the pressure sensor comprises a first piezoelectric pressure transducer extending along a first circumferential portion of the steering control, and a second piezoelectric pressure transducer extending along a second circumferential portion of the steering control.

5. The system of claim 4, wherein the first circumferential portion is greater than 90 degrees and the second circumferential portion is greater than 90 degrees.

6. The system of claim 5, wherein respective signal levels generated by the first and second piezoelectric pressure transducers change with hand movements along the steering control.

7. The system of claim 1, wherein the steering control is aligned with an instrument cluster of the vehicle to be steered, and
   an open area within the steering control and above the hub, for viewing the instrument cluster through the steering control, is greater than a total remaining area enclosed by the steering control, wherein the total remaining area includes the hub the at least one spoke.

8. The system of claim 7, wherein the at least one spoke comprises:
   a first lateral spoke connecting the steering control to the hub at a first lateral side of the hub;
   a second lateral spoke connecting the steering control to the hub at a second lateral side of the hub; and
   a central spoke connecting the steering control to the hub at a location along the steering control between connections to the first and second lateral spokes,
   wherein the first and second lateral spokes are longer than the central spoke, and
   the total remaining area includes the first lateral spoke, the second lateral spoke, the central spoke, and further open areas.

9. A system for generating a vehicle steering signal, comprising:
   a non-rotatable steering control mounted about a steering axis, the steering control comprising a sensor configured to generate an output signal in response to hand movements along the steering control;
   a hub connected to the steering control, wherein the hub is offset from the steering axis; and
   a control unit configured to generate the vehicle steering signal based on the output signal from the sensor, wherein
   the steering control is aligned with an instrument cluster of the vehicle to be steered, and
   an open area within the steering control and above the hub, for viewing the instrument cluster through the steering control, is greater than a total remaining area enclosed by the steering control, wherein the total remaining area includes the hub.

10. The system of claim 9, comprising a steering control column attaching the hub to a vehicle to be steered, wherein the steering control column extends along a column axis, the steering axis and the column axis being non-coincident.

11. The system of claim 9, comprising a communication module located in the hub, and configured to send steering requests to the control unit based on changes in the output signal from the sensor.

12. The system of claim 9, wherein the sensor comprises a pressure sensor including a first piezoelectric pressure transducer extending along a first circumferential portion of the steering control, and a second piezoelectric pressure transducer extending along a second circumferential portion of the steering control.

13. The system of claim 12, wherein the first circumferential portion is greater than 120 degrees and the second circumferential portion is greater than 120 degrees.

14. The system of claim 13, wherein respective signal levels generated by the first and second piezoelectric pressure transducers change with hand movements along the steering control.

15. The system of claim 13, wherein the steering control comprises:
   a first lateral spoke connecting the steering control to the hub at a first lateral side of the hub;
   a second lateral spoke connecting the steering control to the hub at a second lateral side of the hub; and
   a central spoke connecting the steering control to the hub at a location along the steering control between connections to the first and second lateral spokes, and
   wherein the first and second lateral spokes are longer than the central spoke, and
   the total remaining area includes the first lateral spoke, the second lateral spoke, the central spoke, and further open areas.

16. A system for generating a vehicle steering signal, comprising:
   a non-rotatable steering wheel mounted about a steering axis, the steering wheel comprising a hub that is offset from the steering axis, and a pressure sensor configured to generate an output signal in response to hand movements along the steering wheel;

a steering control column attaching the hub to a vehicle to be steered, wherein the steering control column extends along a column axis, the steering axis and the column axis being non-coincident;

a control unit configured to generate the vehicle steering signal based on the output signal from the pressure sensor, wherein the steering wheel is aligned with an instrument cluster of the vehicle to be steered, the steering wheel forms an open area above the hub, the open area being enclosed by the steering wheel and at least partially by the hub, for viewing the instrument cluster through the steering wheel, and the open area is greater than a total remaining area enclosed by the steering wheel, wherein the total remaining area includes the hub.

17. The system of claim 16, wherein the steering wheel further comprises:

a first lateral spoke connecting the steering wheel to the hub at a first lateral side of the hub;

a second lateral spoke connecting the steering wheel to the hub at a second lateral side of the hub; and a central spoke connecting the steering wheel to the hub at a location along the steering wheel between connections to the first and second lateral spokes, wherein the first and second lateral spokes are longer than the central spoke, the open area is enclosed by the steering wheel, the hub and the first and second lateral spokes, and the total remaining area includes the first lateral spoke, the second lateral spoke, the central spoke, and further open areas.

18. The system of claim 16, comprising a communication module located in the hub, and configured to send steering requests to the control unit based on changes in the output signal from the pressure sensor.

19. The system of claim 16, wherein the pressure sensor comprises a first piezoelectric pressure transducer extending along a left hand portion of the steering wheel, and a second piezoelectric pressure transducer extending along a right hand portion of the steering wheel.

20. The system of claim 19, wherein respective signal levels generated by the first and second piezoelectric pressure transducers change with hand movements along the steering wheel.

* * * * *